US008939186B2

(12) United States Patent
Mueller et al.

(10) Patent No.: US 8,939,186 B2
(45) Date of Patent: Jan. 27, 2015

(54) NON-JAMMING LAMINATOR ASSEMBLY

(75) Inventors: Gerald E. Mueller, Eagan, MN (US); Jacob R. Polingo, Minnetonka, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/236,790

(22) PCT Filed: Jul. 25, 2012

(86) PCT No.: PCT/US2012/048117
§ 371 (c)(1),
(2), (4) Date: Feb. 3, 2014

(87) PCT Pub. No.: WO2013/019503
PCT Pub. Date: Feb. 7, 2013

(65) Prior Publication Data
US 2014/0150977 A1 Jun. 5, 2014

Related U.S. Application Data

(60) Provisional application No. 61/514,738, filed on Aug. 3, 2011.

(51) Int. Cl.
B32B 37/00 (2006.01)
B32B 37/10 (2006.01)
B32B 37/06 (2006.01)
B32B 37/14 (2006.01)

(52) U.S. Cl.
CPC ............. *B32B 37/10* (2013.01); *B32B 37/0053* (2013.01); *B32B 37/06* (2013.01); *B32B 37/142* (2013.01)
USPC ............................ 156/499; 156/555; 156/582

(58) Field of Classification Search
USPC ....................... 156/499, 555, 580, 582, 583.1
See application file for complete search history.

(56) References Cited

U.S. PATENT DOCUMENTS

| 6,244,319 | B1 * | 6/2001 | Maynard et al. | 156/354 |
| 6,283,188 | B1 * | 9/2001 | Maynard et al. | 156/521 |
| 7,832,445 | B2 * | 11/2010 | James et al. | 156/499 |
| 2004/0040669 | A1 * | 3/2004 | Lin | 156/555 |

* cited by examiner

*Primary Examiner* — James Sells
(74) *Attorney, Agent, or Firm* — Robert H. Jordan

(57) ABSTRACT

A laminator assembly (100) comprises an anti-jam feature comprising wire (104) running from the entrance zone (106) to the exit zone (108) of transfer passage through circumferential slits (110) in the rollers (112, 118) such that a lamination pouch is prevented from wrapping around the rollers (112, 118).

10 Claims, 4 Drawing Sheets

NON-JAMMING LAMINATOR ASSEMBLY

CROSS REFERENCE TO RELATED APPLICATIONS

This is a national stage filing under 35 U.S.C. 371 of PCT/US2012/048117, filed 25 Jul. 2012, which claims priority to U.S. Provisional Application No. 61/514,738, filed 3 Aug. 2011, the disclosure of which is incorporated by reference in its/their entirety herein.

FIELD

This invention relates to non-jamming laminator assemblies for use in laminators such as thermal laminators.

BACKGROUND

Lamination is a commonly used method for protecting and preserving flat sheet articles such as paper documents and photos. Thermal laminators utilize heat to laminate the sheet article between pieces of protective film. Typically, a lamination pouch comprising a heat curable adhesive-backed film that is sealed on one edge is utilized. A sheet article to be preserved is placed in the lamination pouch and the pouch is fed between a pair of heated rollers, which compress the pouch and activate the adhesive.

The sealed edge of the lamination pouch is intended to be the leading edge of the pouch as it is fed into the laminator to ensure that the lamination pouch does not adhere to the roller during lamination. Many laminator users, however, mistakenly feed the pouch into the laminator backwards. In addition, some laminator users cut the lamination pouch (for example, to customize the size of the pouch) prior to insertion into the laminator. In both of these situations, adhesive may be left exposed or may be squeezed out along the leading edge. The leading edge may therefore stick to one of the rollers and wrap around the roller causing the laminator to jam.

Various approaches have been utilized to address the problem of thermal laminator jamming. For example, U.S. Pat. No. 7,886,792 discloses incorporating a sensing element beside the roller for detecting jamming and reversely rotating the roller to eject a jammed sheet article. U.S. Pat. No. 7,832,445 discloses using a set of blade members positioned on the exit side of the rollers for preventing the lamination pouch from passing between the roller and the blade members.

SUMMARY

Briefly, in one aspect, the present invention provides a non-jamming laminator assembly comprising (a) a transfer passage comprising an entrance zone, a compression zone, and an exit zone, (b) a pair of rollers comprising a first roller and a second roller, the pair of rollers defining the compression zone for compressing a lamination pouch as it passes therebetween, and the first roller comprising at least one circumferential slit in its exterior surface, and (c) an anti-jam feature comprising wire running from the entrance zone to the exit zone through the circumferential slit in the first roller such that the lamination pouch is prevented from wrapping around the first roller.

In another aspect, the present invention provides a non-jamming laminator assembly comprising (a) a transfer passage comprising an entrance zone, a compression zone, and an exit zone, (b) a pair of rollers comprising a first roller and a second roller, the pair of rollers defining the compression zone for compressing a lamination pouch as it passes therebetween, and the first roller and the second roller each comprising a plurality of circumferential slits in their exterior surfaces, and (c) an anti-jam feature comprising (i) one or more wires running from the entrance zone to the exit zone through the circumferential slits in the first roller such that the lamination pouch is prevented from wrapping around the first roller and (ii) one or more wires running from the entrance zone to the exit zone through the circumferential slits in the second roller such that the lamination pouch is prevented from wrapping around the second roller. The one or more wires running through the slits in the first roller may or may not be the same one or more wires running through the slits in the second roller.

The non-jamming laminator assemblies of the invention prevent lamination pouches from adhering to the rollers and jamming the laminator even when adhesive is exposed at the leading edge of the pouch. The non-jamming laminator assemblies of the invention are easily constructed and have a more forgiving manufacturing process than, for example, the manufacturing process used in making laminator assemblies containing blades, wherein misalignment is more likely. The wires utilized in the laminator assemblies of the invention will stay within slits in the rollers even when they are somewhat misaligned at the entrance and/or exit zone.

DETAILED DESCRIPTION

The non-jamming laminator assemblies of the invention are designed for use in laminators incorporating additional conventional components such as, for example, drive mechanisms, control electronics, and external and internal housings. One of skill in the art is familiar with these conventional components and a detailed discussion of these components is not required for understanding the present invention. Thus, for clarity, the figures illustrate only the principal components of the laminator assembly of the invention and not all of the components of a complete laminator.

Figure 1A:
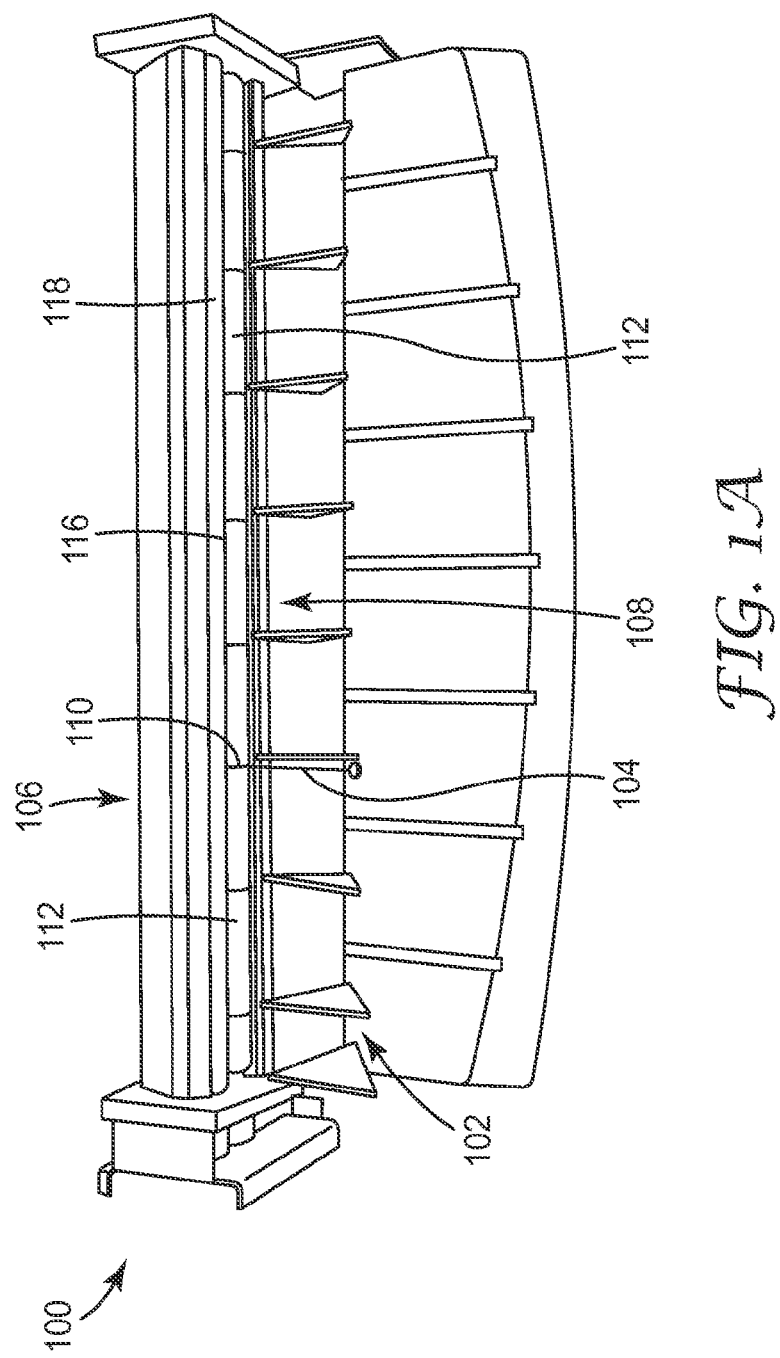
FIG. 1A shows an embodiment of a laminator assembly of the invention.
Figure 1B:
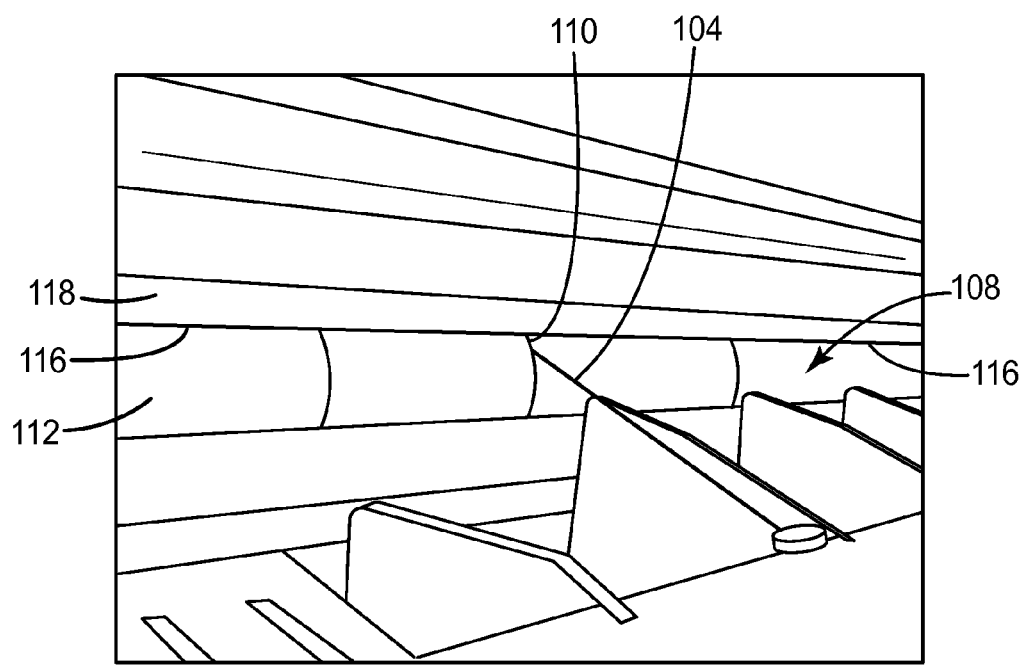
FIG. 1B shows a close-up view of the exit side of the laminator assembly of FIG. 1A.

FIG. 1A shows an embodiment of an anti-jam laminator assembly of the invention. Laminator assembly 100 includes anti-jam feature 102, which includes wire 104 that runs from entrance zone 106 to exit zone 108 through circumferential slit 110 in first roller 112. When laminator assembly 100 is used in a laminator, a lamination pouch is fed through transfer passage 114 so that it advances from entrance zone 106 through compression zone 116, which is defined by first roller 112 and second roller 118, to exit zone 108. A heat source (not shown) heats the lamination pouch as it is compressed between rollers 112 and 118 and activates the adhesive. Wire 104 prevents the lamination pouch from wrapping around roller 112. FIG. 1B is a close up of the exit side of laminator assembly 100.

Figure 2:
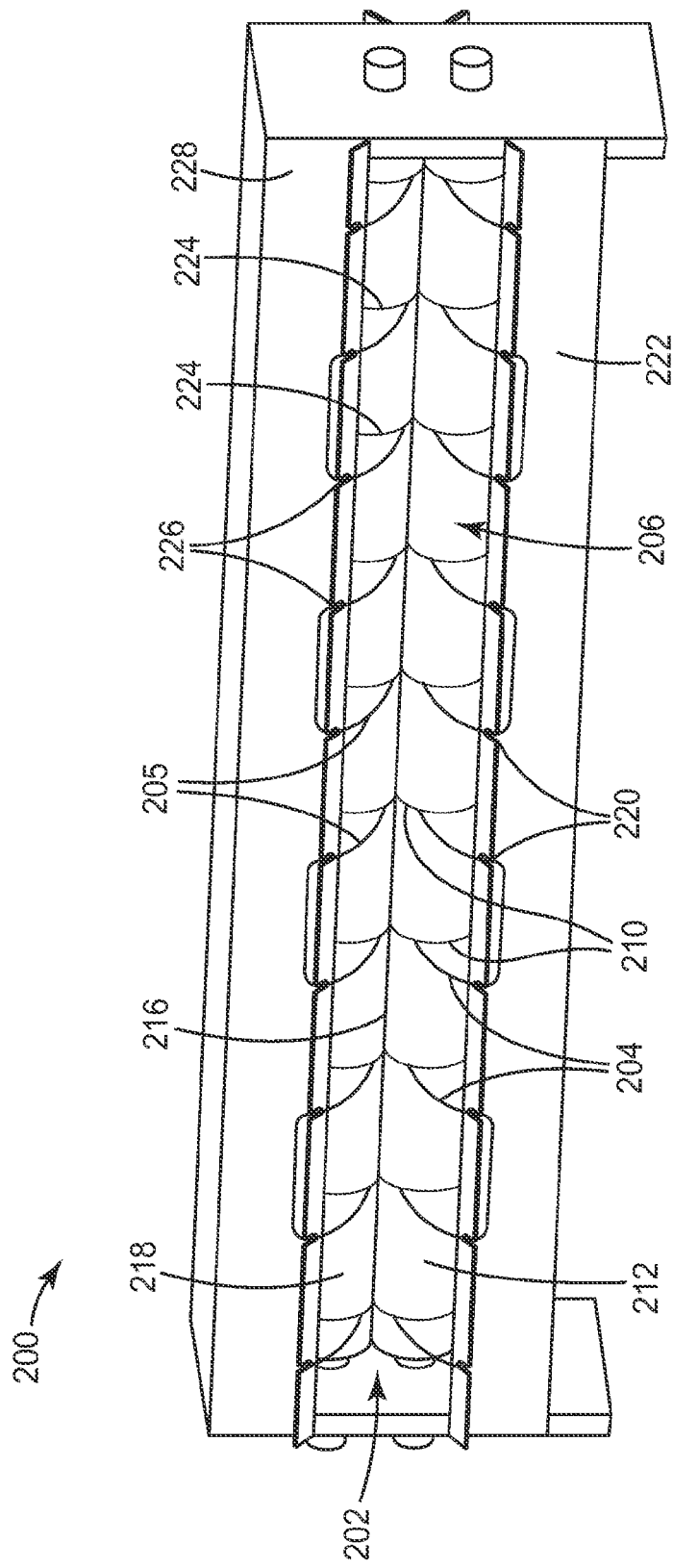
FIG. 2 shows another embodiment of a laminator assembly of the invention.

FIG. 2 shows another embodiment of an anti jam laminator assembly of the invention. Laminator assembly 200 includes anti-jam feature 202, which includes wires 204 and 205 for preventing the lamination pouch from wrapping around first roller 212 and second roller 218. In this embodiment, a single continuous wire 204 is threaded through slits 210 in roller 212 and notches 220 in bottom shroud 222. A separate continuous wire 205 is threaded through slits 224 in roller 218 and notches 226 in top shroud 228. Although in this embodiment, separate wires are used on the two rollers, one continuous wire could be threaded through all of the slits on the first roller and the second roller.

In the laminator assemblies shown in FIGS. 1 and 2, the "first" roller is the bottom roller. The term "first" is not intended, however, to specify a location of one roller relative to another. In other embodiments of the invention, the first roller may be the top roller (or if the rollers are disposed side by side, the first roller may be, for example, the front roller or the rear roller).

Any useful wire may be used in the anti-jam laminator assembly of the invention. The wire may be made, for example, of stainless steel or other useful metals. The wire may also be made of polymeric materials that can withstand the operating temperature of the laminator. The wire may be round or have any other useful shape. In some embodiments, the wire is round and has a diameter of about 0.005 inches to about 0.01 inches. Preferably, the wire has a diameter of about 0.006 inches to about 0.008 inches. In some embodiments, the wire may comprise a low surface energy material or may be coated with a low surface energy coating to help prevent adhesive buildup on the wire. Suitable low surface energy materials include polytetrafluoroethylene (PTFE), such as FluoroMed BL2-2782-ZP Clear from Surface Solutions Group, LLC, Chicago, Ill.

Slits in the rollers are preferably deep enough to allow the wire to be completely positioned below the exterior of the roller surface in order to provide a smooth lamination surface. In some embodiments, the slits are from about 1 mm to about 4 mm deep. Preferably, the slits are from about 1 mm to about 2 mm deep. In some embodiments, for example when the roller comprises a metal shaft with rubber around it, it is preferable that the slits do not completely penetrate the rubber. When more than one slit is used, the slits may be spaced apart in any useful configuration. In some embodiments, the slits are spaced about 15 mm to about 40 mm apart. In particularly suitable embodiments, the slits are spaced apart about 20 mm to about 30 mm apart. If slits are provided in the first roller and the second roller in order to have wires running across both rollers, the slits in the first roller may be offset from the slits in the second roller.

Figure 3A:
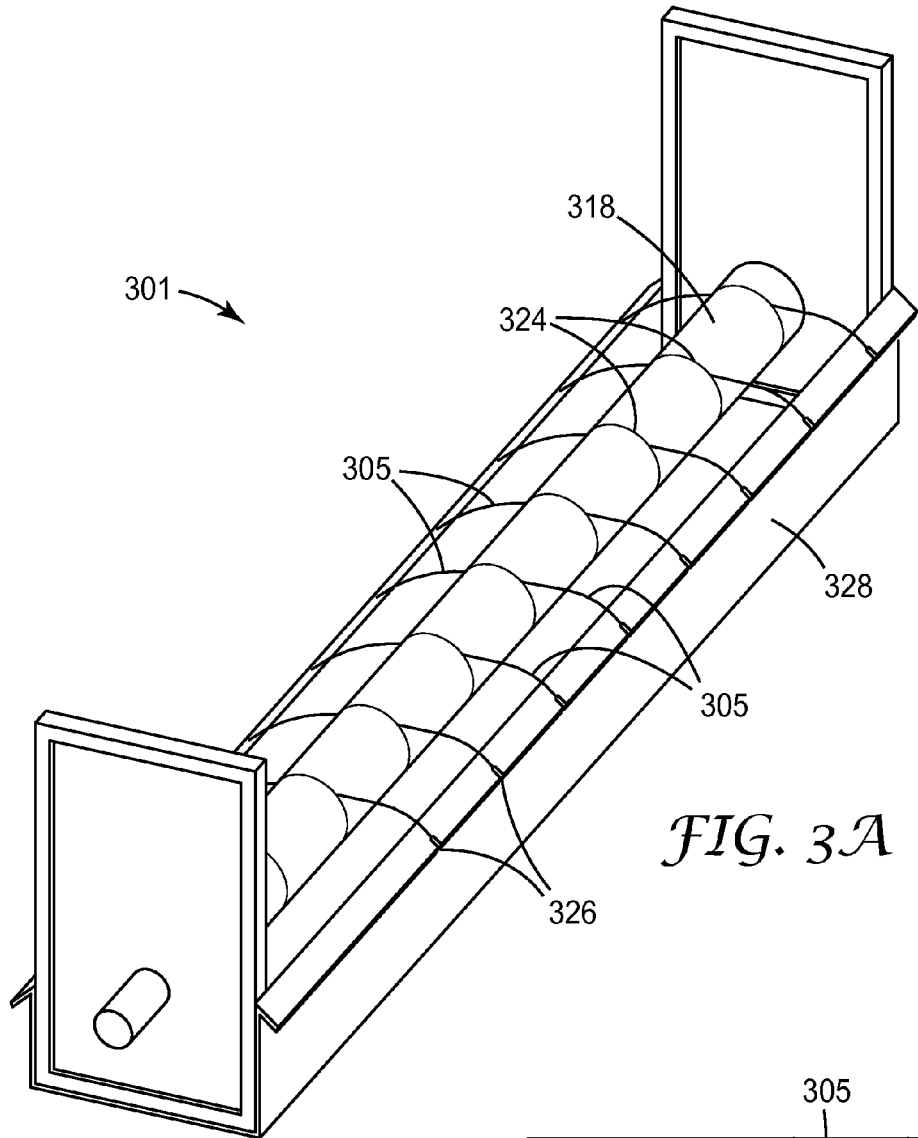
FIG. 3A shows a laminator sub-assembly.
Figure 3B:
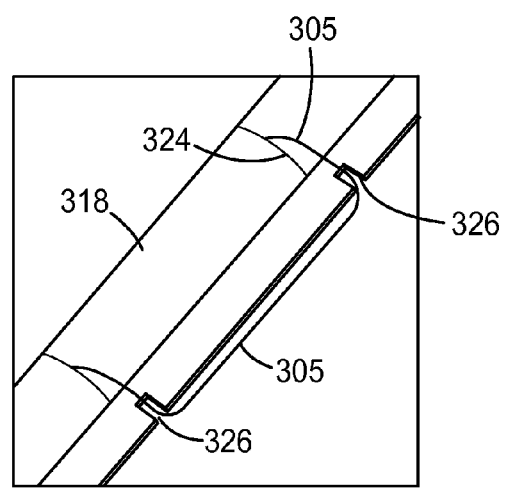
FIG. 3B shows a close-up view of a portion of the laminator sub-assembly of FIG. 3A.

The wire can be attached to the to the laminator assembly and threaded through roller slits in various ways. For example, a single wire may be used for a roller even if the roller has multiple slits. FIG. 3A shows laminator sub-assembly 301 (showing only the top roller viewed upside down) wherein a single continuous wire 305 is threaded through slits 324 in roller 318 and notches 326 in shroud 328. FIG. 3B a close-up view of how wire 305 is threaded through notches 326 in shroud 328 in laminator assembly 301. Alternatively, the wire could run through holes instead of notches or be threaded in various other manners.

Shrouds used in the invention may take on any useful configuration for securing and lacing the wires through the slits in the rollers. The shroud may be made, for example, of metal, calorific board or any other suitable material. In other embodiments, separate wires may be used for each slit and tied off at the shroud on the entrance and exit sides of the roller.

The wires easily engage and lift a lamination pouch at the exit zone as it leaves the compression zone of the rollers. The wires can also be positioned to guide the lamination pouch onto exit guide bars and/or an exit ramp.

The laminator assemblies of the invention are useful in various types of laminators. They are useful, for example, in laminators used with lamination pouches or sheets containing pressure sensitive adhesive (PSA). They are particularly useful in thermal laminators, which include a heat source for heating a lamination pouch and activating a heat curable adhesive as the pouch passes through the compression zone.

EXAMPLES

Objects and advantages of this invention are further illustrated by the following examples, but the particular materials and amounts thereof recited in these examples, as well as other conditions and details, should not be construed to unduly limit this invention.

Sample Strips

Sample strips were prepared by cutting Scotch™ Thermal Laminating Pouches, 9 inches×11.4 inches (TP3854-50) from 3M Company into 1 inch wide strips with an adhesive overlap of approximately ⅜ inch on the leading edge.

Comparative Example

A sample strip prepared as described above was fed into a Scotch™ Thermal Laminator TL -901 available from 3M Company. The sample strip wrapped around the roller and caused the laminator to jam.

Example 1

A Scotch™ Thermal Laminator TL-901 was modified to include a single wire (302 stainless steel spring tempered wire with a 0.10 in (0.254 mm) diameter) positioned in a slit in the lower lamination roller. The slit, which was approximately 3 mm deep, was made using a razor blade. The wire was secured on the entrance and exit sides of the lamination roller as shown in FIG. 1. A sample strip prepared as described above was fed into the laminator and the laminator did not jam. This test was repeated multiple times and no jamming occurred.

Example 2

A Scotch™ Thermal Laminator TL-901 was modified to include a 0.010 inch diameter 302 stainless steel spring tempered wire positioned in slits spaced 30 mm apart in the lower lamination roller. The wire was positioned below the exterior surface at the lamination or compression point to provide a smooth surface for lamination. The slits, which were approximately 3 mm deep, were made using a razor blade. The wire was secured on the entrance and exit sides of the lamination roller. A sample strip prepared as described above was fed into the laminator and the laminator did not jam. This test was repeated multiple times and no jamming occurred.

Example 3

A Scotch™ Thermal Laminator TL-901 was modified to include an XLO Brand 0.005 inch diameter music wire (available from Johnson Steel & Wire, Worcester, Mass.) positioned in slits spaced 1 inch apart in the lower lamination roller. Another piece of the wire was positioned in slits spaced 1 inch apart in the upper lamination roller and threaded through an aluminum shroud. The slits in the upper roller were offset from the slits in the lower roller and threaded through an aluminum shroud. A sample strip prepared as described above was fed into the laminator and the laminator did not jam. This test was repeated multiple times and no jamming occurred.

The complete disclosures of the publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A laminator assembly comprising:
   (a) a transfer passage comprising an entrance zone, a compression zone, and an exit zone;
   (b) a pair of rollers comprising a first roller and a second roller, the pair of rollers defining the compression zone for compressing a lamination pouch as it passes therebetween, and the first roller comprising multiple circumferential slits in its exterior surface, the circumferential slits being from about 1 mm to about 2 mm deep and spaced from about 20 mm to about 30 mm apart; and
   (c) an anti-jam feature comprising wire running from the entrance zone to the exit zone through the circumferential slit in the first roller such that the lamination pouch is prevented from wrapping around the first roller, the wire having a diameter of from about 0.005 inch to about 0.01 inch.

2. The laminator assembly of claim 1 wherein the second roller comprises multiple circumferential slit in its exterior surface and wherein the anti-jam feature further comprises wire running from the entrance zone to the exit zone through each circumferential slit in the second roller such that the lamination pouch is prevented from wrapping around the second roller.

3. The laminator assembly of claim 1 further comprising a heat source for heating the lamination pouch as the lamination pouch passes through the lamination zone.

4. The laminator assembly of claim 2 wherein the slits in the first roller are offset from the slits in the second roller.

5. The laminator assembly of claim 1 wherein the wires have a diameter of about 0.006 inches to about 0.008 inches.

6. The laminator assembly of claim 1 wherein the wires are positioned completely below the exterior surface of the rollers in the compression zone.

7. The laminator assembly of claim 1 wherein the wires comprise a low surface energy material.

8. The laminator assembly of claim 2 wherein one continuous wire is threaded through all of the slits in the first roller and the second roller.

9. The laminator assembly of claim 1 wherein the wires are stainless steel.

10. The laminator assembly of claim 1 wherein the anti-jam feature guides the lamination pouch onto one or more exit guide bars.

* * * * *